United States Patent [19]
Wang

[11] Patent Number: 5,475,221
[45] Date of Patent: Dec. 12, 1995

[54] OPTICAL SPECTROMETER USING LIGHT EMITTING DIODE ARRAY

[75] Inventor: Xiaolu Wang, Wilmington, Del.

[73] Assignee: Brimrose Corporation of America, Baltimore, Md.

[21] Appl. No.: 240,984

[22] Filed: May 11, 1994

[51] Int. Cl.[6] .................................................. G01N 29/02
[52] U.S. Cl. ...................................................... 250/339.07
[58] Field of Search ........................ 250/339.07, 339.01, 250/339.06, 339.11, 338.5; 356/73, 318, 319, 320, 323

[56] References Cited

U.S. PATENT DOCUMENTS

| | | | |
|---|---|---|---|
| 4,505,550 | 3/1985 | Steinbruegge | 250/339.01 |
| 4,652,756 | 3/1987 | Ryan et al. | 250/338.5 |
| 5,039,855 | 8/1991 | Kemeny et al. | 250/339.07 |
| 5,120,961 | 6/1992 | Levin et al. | 250/339.07 |

*Primary Examiner*—Paul M. Dzierzynski
*Assistant Examiner*—Richard Hanig
*Attorney, Agent, or Firm*—Max Stul Oppenheimer

[57] ABSTRACT

A novel optical device is provided which uses an array of light emitting diodes, controlled by novel multiplexing schemes, to replace conventional broad band light sources in devices such as spectrometers.

6 Claims, 9 Drawing Sheets

OPTICAL SPECTROMETER USING LIGHT EMITTING DIODE ARRAY

FIELD AND BACKGROUND OF THE INVENTION

The present invention relates to optical spectrometry and more particularly to optical spectrometers incorporating an array of light emitting diodes as a broad band light source.

The invention described and claimed herein comprises a novel optical spectrometer using a light emitting diode array, controlled by novel multiplexing schemes in place of a conventional broadband light source.

To illustrate the operation of the invention, a spectrometer incorporating the novel device with an acousto-optic tunable filter (AOTF) will be described.

An AOTF is a birefringent crystal having a piezo-electric transducer bonded to it. Broad band light radiation passing through such a crystal can be diffracted into specific wavelengths by application of a radio-frequency driving signal to the transducer. The AOTF in combination with a broadband light source can be used as a part of an optical spectrometer, a tunable monochromatic light source or other optical instrument. When coupled to fiber optics, the AOTF can be located remotely from the sample of interest.

An AOTF is a solid state device and has several advantages over alternative spectroscopic techniques such as diffraction gratings, prisms, filter wheels or Fourier interferometer. The AOTF is rugged since it has no moving parts; it is compact, fast and can provide random access. These features allow AOTF-based optical instruments to be used in industrial environments for real-time, on-line process control, and for remote applications (including such extreme remote applications as planetary exploration).

To date, there has been no broadband light source of comparable advantage for use in such applications. Typically, the broadband light source is an incandescent lamp which needs to be replaced after several thousand hours of operation and is susceptible to malfunction due to mishandling or simply due to vibration. Typical lamps also consume considerable power and generate heat which must be dissipated.

Thus, the light source is the "weak link" in rugged-environment or remote sensing applications, since prior art devices rely on sources which are unreliable, inefficient, susceptible to damage, and require high power consumption and resultant heat dissipation.

SUMMARY OF THE INVENTION

The foregoing problem is overcome, and other advantages are provided by an optical system which replaces conventional broadband light sources with an array of LEDSs, selected, configured and controlled as described herein so as to simulate the optical emissions of a broadband light source.

In the present invention, light emitting diodes (LEDs) will be used instead of the conventional incandescent lamp. Since a single LED has a narrow optical spectral bandwidth, it is unsuitable as a broadband light source. Therefore, an array of LEDs is used to produce the desired bandwidth. The bandwidth need not be limited to the visible portion of the spectrum; commercially available LEDs can extend the spectrum to the infrared wavelength region. The array of LEDs must be combined to simulate the effect of a broadband light source.

A key feature of the present invention is the use of a light emitting diode array (LEDA) as a light source in coupling with a monochromator, for example an acousto-optic tunable filter. The AOTF acts as a monochromator to provide broad band spectral tuning and selection. The LEDA consists of multiple LEDs which are operated in either time domain multiplexed (TDM) mode in synchronization with the AOTF, or frequency domain multiplexed (FDM) mode, or a combination of both.

Among the objects of the present invention are to provide a new and useful class of optical apparatus which can replace prior art optical devices which rely on a broadband light source, yet can:

1. Operate for a longer period without maintenance. An LED has a much longer lifetime than an incandescent lamp. Furthermore, unlike incandescent lamps, LEDs do not have a vibration sensitive filament and are not adversely affected by high or low gravity.
2. Operate with lower power consumption than conventional broadband light sources.
3. Be produced in a smaller package than a conventional broadband light source.
4. Have a higher light coupling efficiency into optical fibers of AOTF.

These and other objects which will be apparent from the discussion which follows are achieved, in accordance with the invention, by providing a class of novel optical devices using a light emitting diode array, controlled by novel multiplexing schemes in place of a conventional broadband light source.

The various features of novelty which characterize the invention are pointed out with particularity in the claims annexed to and forming a part of this disclosure. For a better understanding of the invention, its features, advantages and objects, reference is made to the accompanying drawings and descriptive matter in which a preferred embodiment of the invention is illustrated.

BRIEF DESCRIPTION OF THE DRAWINGS

The foregoing and still other objects of this invention will become apparent, along with various advantages and features of novelty residing in the present embodiments, from study of the following drawings, in which.

DESCRIPTION OF THE PREFERRED EMBODIMENT

Figure 1:
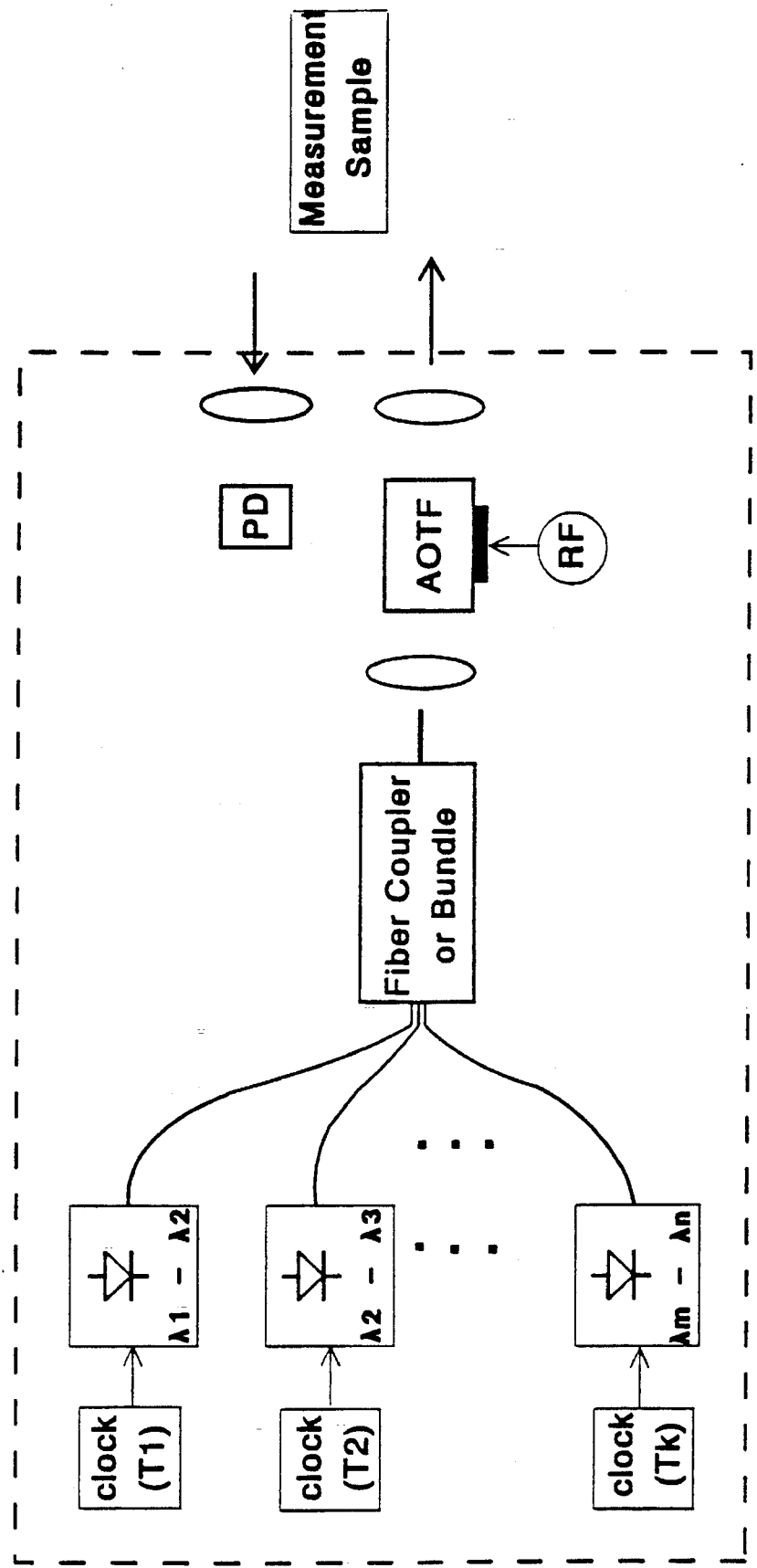
FIG. 1 is an illustration of the basic concept of the present invention. A time domain multiplexed LED array is coupled through optical fiber coupler or multi-input fiber bundle into an acousto-optic tunable filter.

Referring to the drawings, the invention is a novel optical spectrometer using a light emitting diode array, controlled by novel multiplexing scheme in place of a conventional broadband light source shown in overview in FIG. 1.

The basic concept is illustrated in FIG. 1 in the context of a LEDA light source coupled to an AOTF. A LEDA covers a broad wavelength region; each individual LED is operated in a narrow wavelength sub-region with different center wavelengths, respectively. The output of the individual LEDs is combined to produce the broadband array output through an optical fiber coupler or an optical fiber bundle (which may be advantageous in reducing insertion loss). The LEDs are time domain multiplexed in coordination with the wavelength tuning of the AOTF. At a specific time, only selected LEDs are to be turned on. Therefore, broadband (or random) tuning can be achieved without all LEDs being lighted at all times. In addition, because LEDs are quantum devices with higher electro-optic conversion efficiency than conventional broadbands sources, required electric operating power can be dramatically reduced in comparison to the conventional approaches in which an incandescent is used.

Unlike an incandescent lamp, LEDs do not have a vibration sensitive filament and are not adversely affected by high or low gravity. Moreover, an LED has a much smaller light emitting area in comparison to the lamp, so that light can be coupled into the fiber or AOTF more efficiently.

Figure 2:
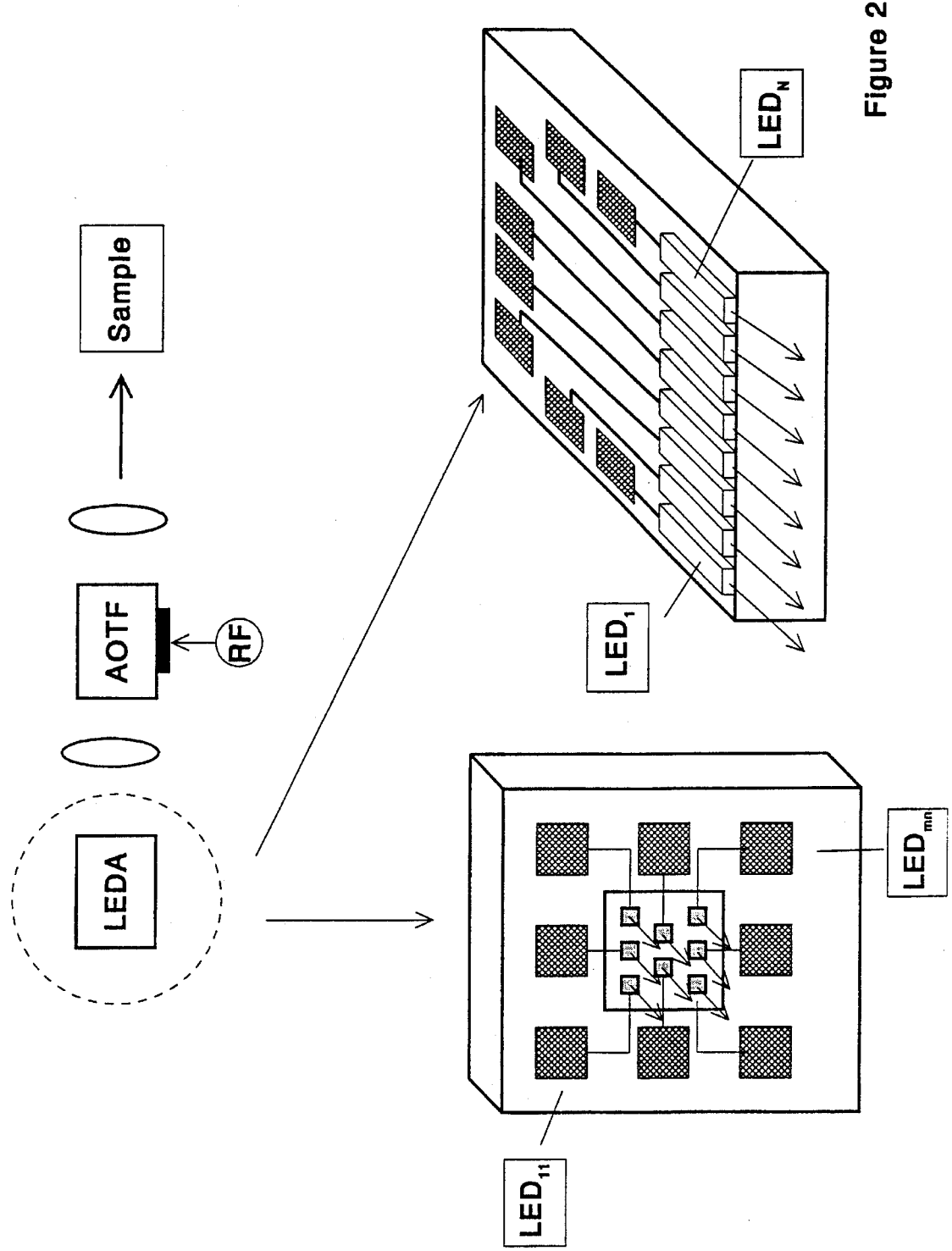
FIG. 2 is a variation from FIG. 1 in which the output light from an integrated LED array chip is directly coupled into an acousto-optic tunable filter.

There are many variations of combining and coupling the light output of LEDs into the AOTF. FIG. 2 shows LEDs can be integrated into a single chip either in the form of a linear array or 2-D array so that the light emitting areas of each diode are physically close to each other. The light output from the integrated LED array chip can then be directly coupled into an AOTF.

Figure 3:
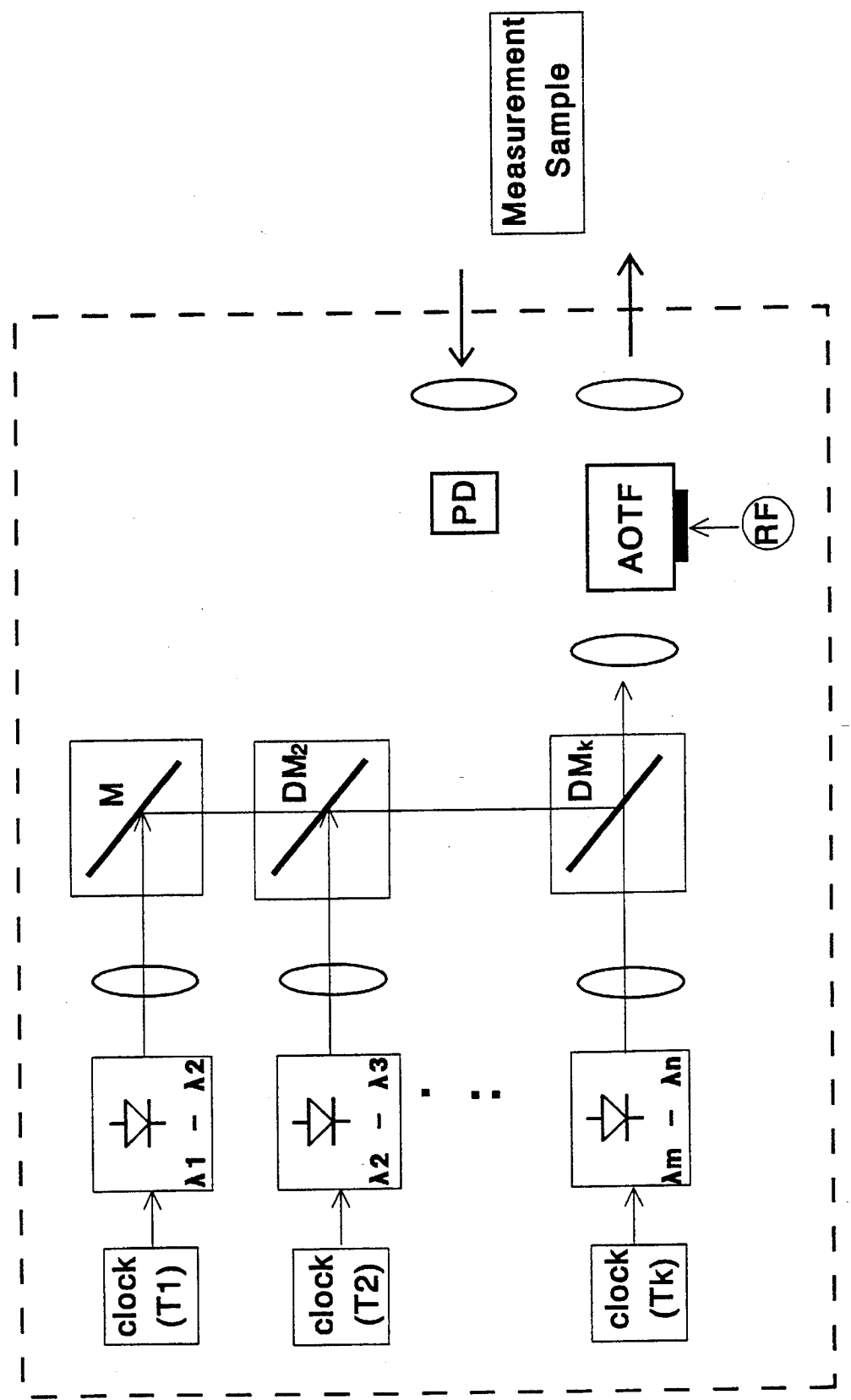
FIG. 3 is a variation from FIG. 1 in which a time domain multiplexed LED array (linear array or 2-D array) is coupled into an acousto-optic tunable filter through a set of dichroic mirrors.

FIG. 3 shows another variation of combining and coupling light output of LEDs into an AOTF. As shown in the figure, a set of dichroic mirrors is used.

Figure 4:
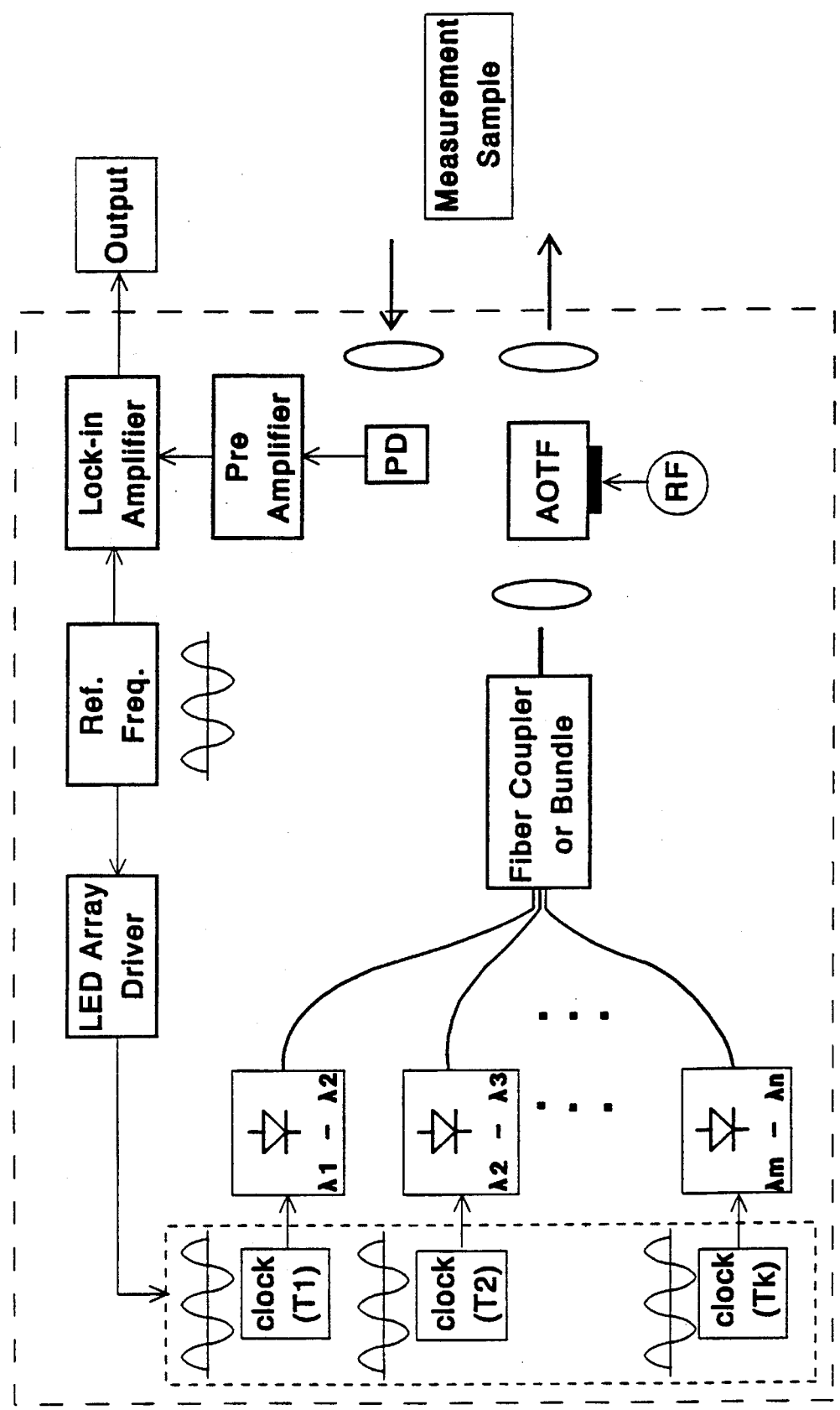
FIG. 4 is an illustration of a lock-in amplification scheme in which the LED array is amplitude modulated by the a reference-by changing bias current.

LEDs can be fast modulated by variation of bias current so that frequency domain multiplexed (FDM) and/or lock-in amplification schemes can be implemented. FIG. 4 illustrates an example of a lock-in amplification scheme in which the LED array is amplitude modulated by a reference signal. A lock-in amplifier is used in which it only amplifies the signal through electric bias current proper phase and frequency relationship to the reference signal.

Figure 5:
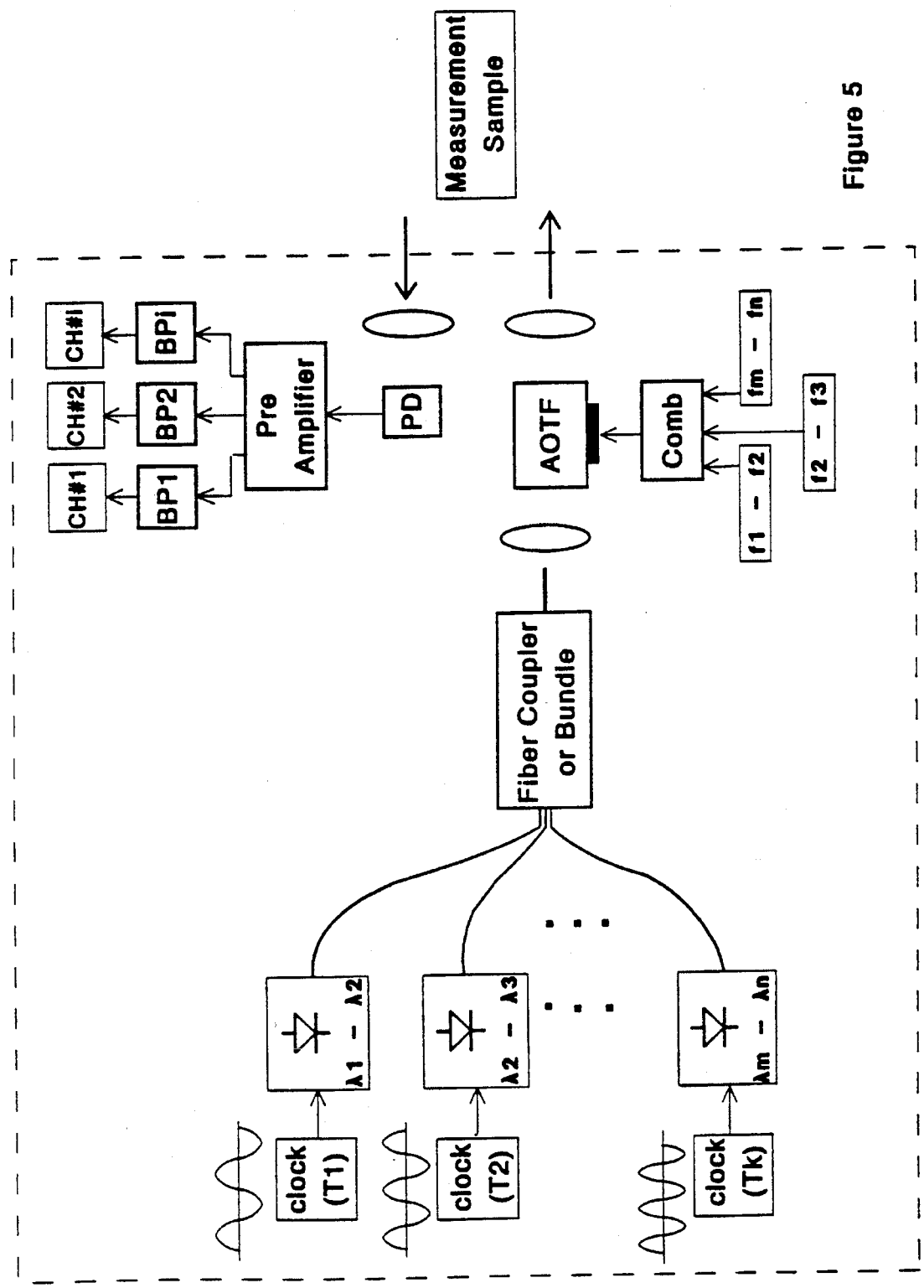
FIG. 5 is an illustration of frequency domain multiplexed (FDM) scheme in which multiple LEDs are modulated at different frequencies, the wavelength at different LED region can be simultaneously separated out through electronic filtering.

FIG. 5 illustrates a frequency domain multiplexed (FDM) scheme in which multiple LEDs are modulated at different frequencies. The wavelength sub-region corresponding to different center wavelengths can be simultaneously separated out through electronic filtering. This scheme can be utilized to implement powerful matched filtering algorithms and/or further increase the speed of wavelength sweeping.

Figure 6:
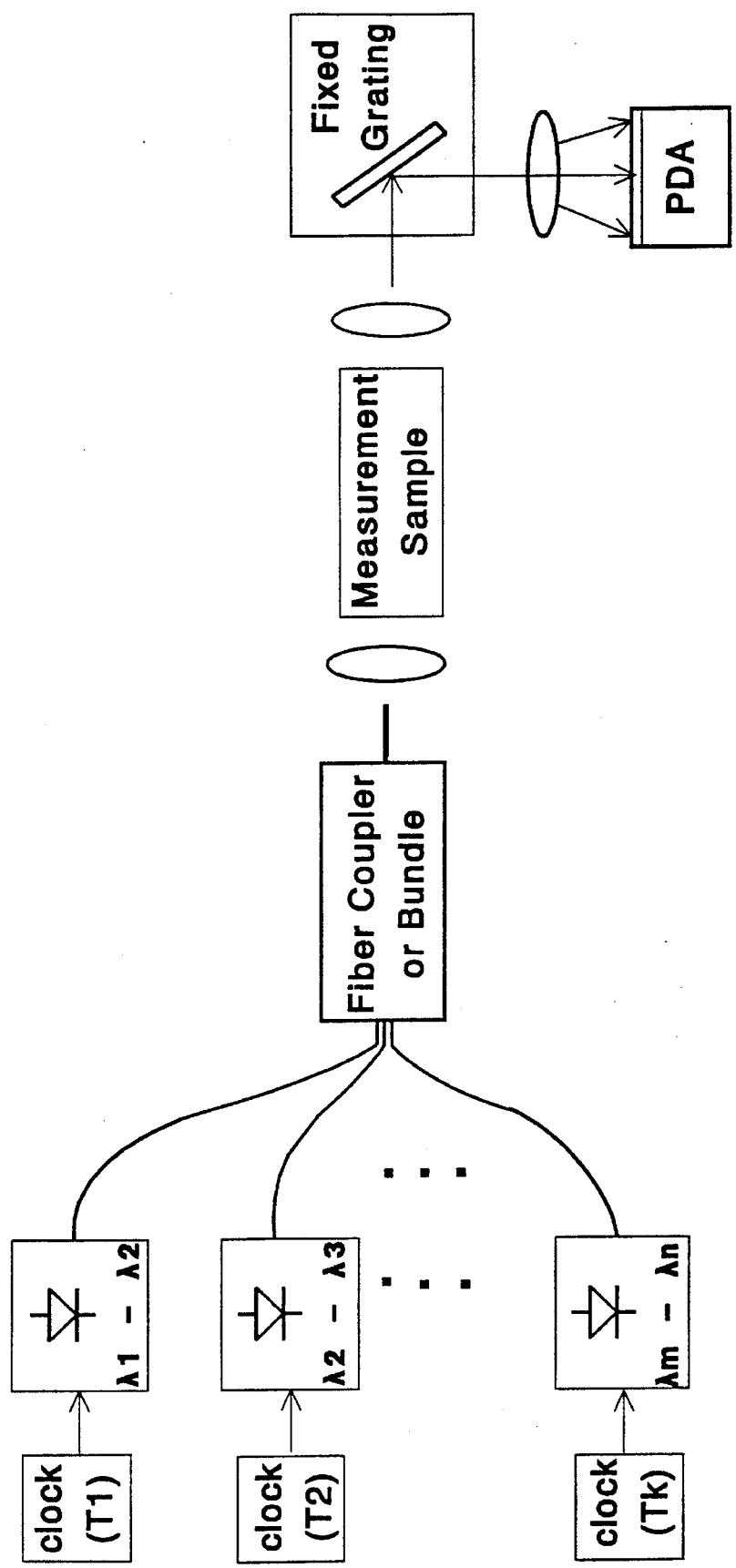
FIG. 6 is an illustration of time domain multiplexed LED array is coupled into a fixed grating with a linear diode array (or charge coupled device).

The basic concept of the present invention can also be applied in combination with monochromators other than AOTFs. FIG. 6 is an example in which a time domain multiplexed LED array is coupled with a fixed grating and a linear diode array (or charge coupled device).

Figure 7:
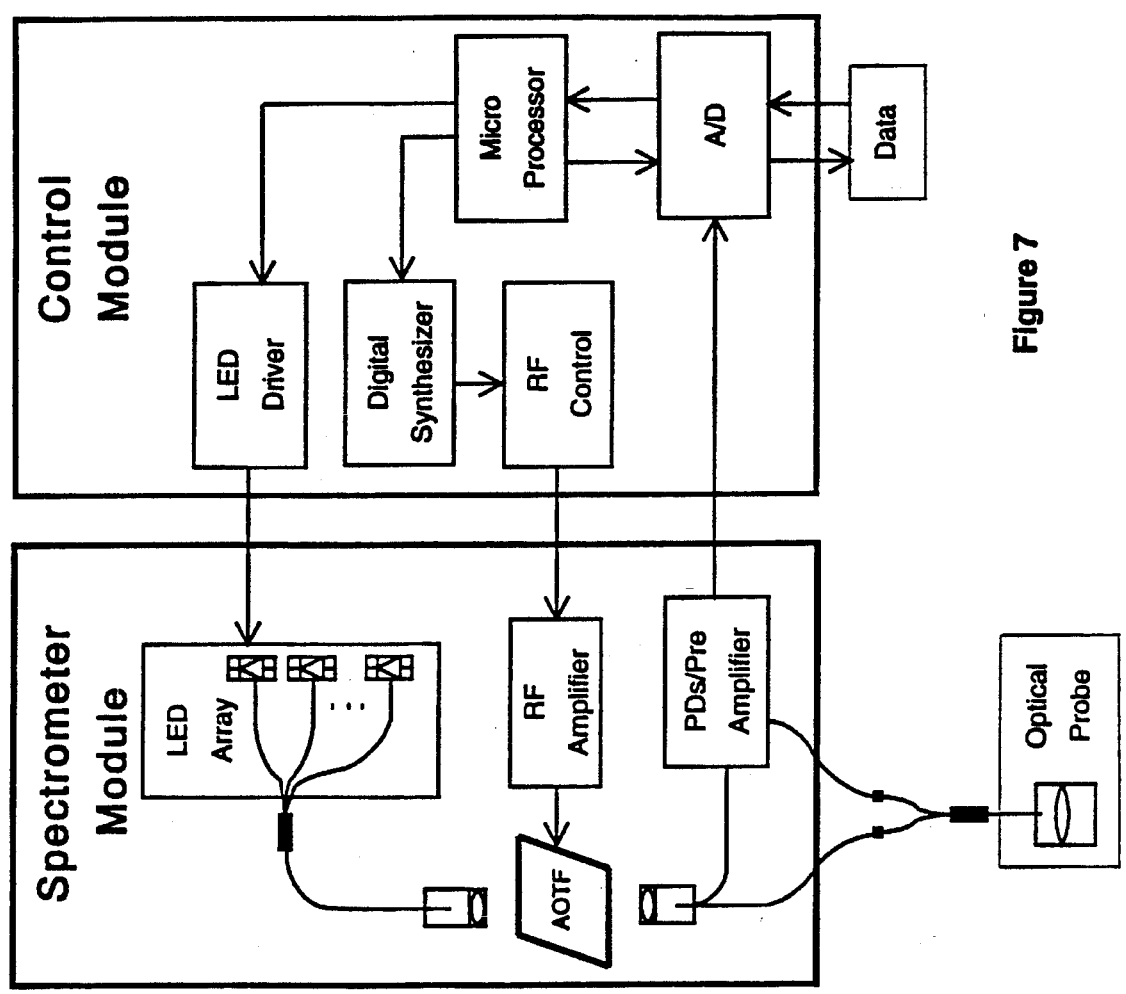
FIG. 7 is an illustration of experimental setup of an optical spectrometer.

The concept and preliminary experimental results of the present invention have been demonstrated. FIG. 7 is the schematic which shows an experimental setup of an NIR optical spectrometer. It consists of two modules, a spectrometer module and an electronic control module. In the spectrometer module, an array of LEDs combined through an optical fiber coupler provides a broad band light source. A $TeO_2$ non-collinear AOTF operates between 0.8–1.7 μm provides wavelength tuning. The monochromatic light generated by the AOTF is delivered to a sensing probe head through a bifurcated fiber bundle and collected back to an InGaAs photodetector. The electronic control module consists of an LED driver which provides bias current as well as switching and multiplexing operations to the individual LEDs. It also includes a microprocessor controlled digital synthesizer and RF control unit for driving the AOTF. The electrical signal from the photodetector/pre-amplifier is interfaced with an analog to digital converter for data acquisition and post processing.

Figure 8:
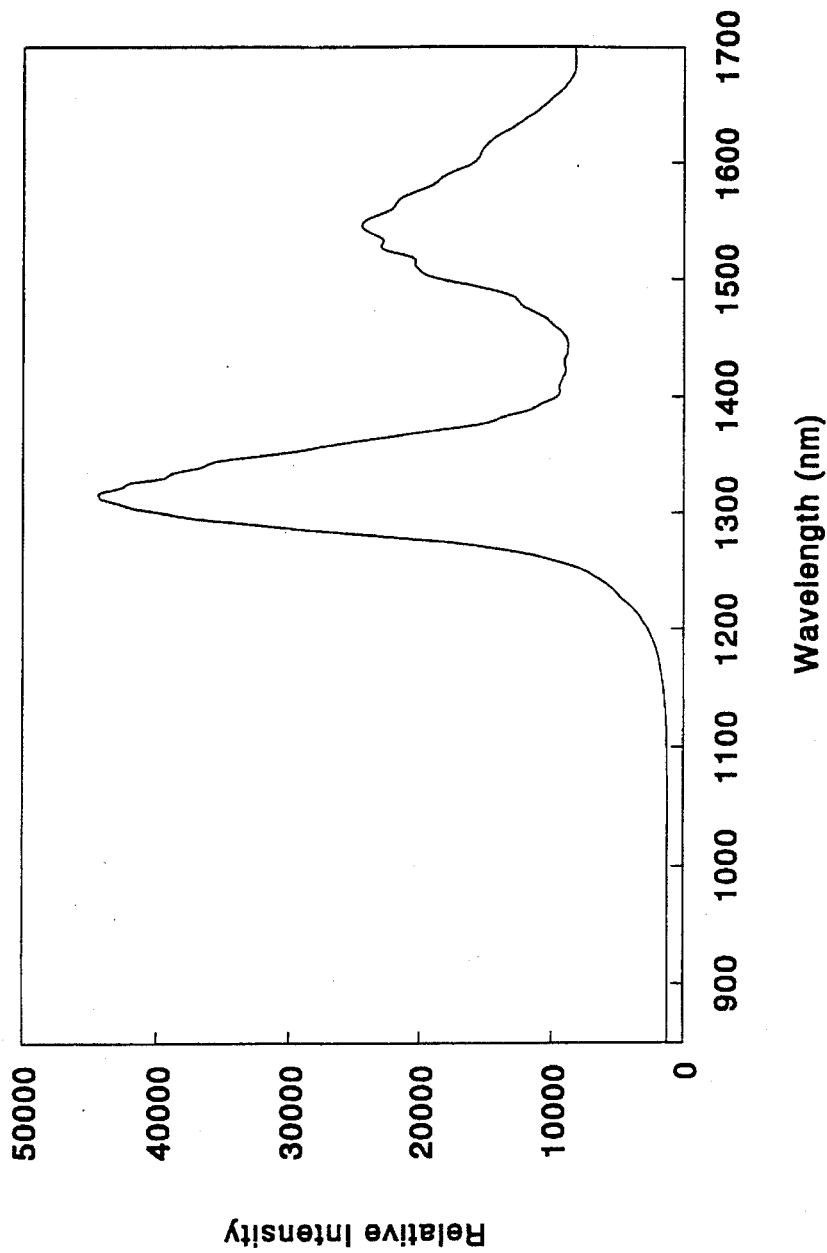
FIG. 8 is the background spectrum of a two LED array. The two LED are centered at 1.3 μm and 1.55 μm respectively.

The background reflectance spectrum acquired by this spectrometer is shown in FIG. 8. It shows the spectrum of a two LED array with two distinct peaks centered near 1.3 μm and 1.55 μm region.

Figure 9:
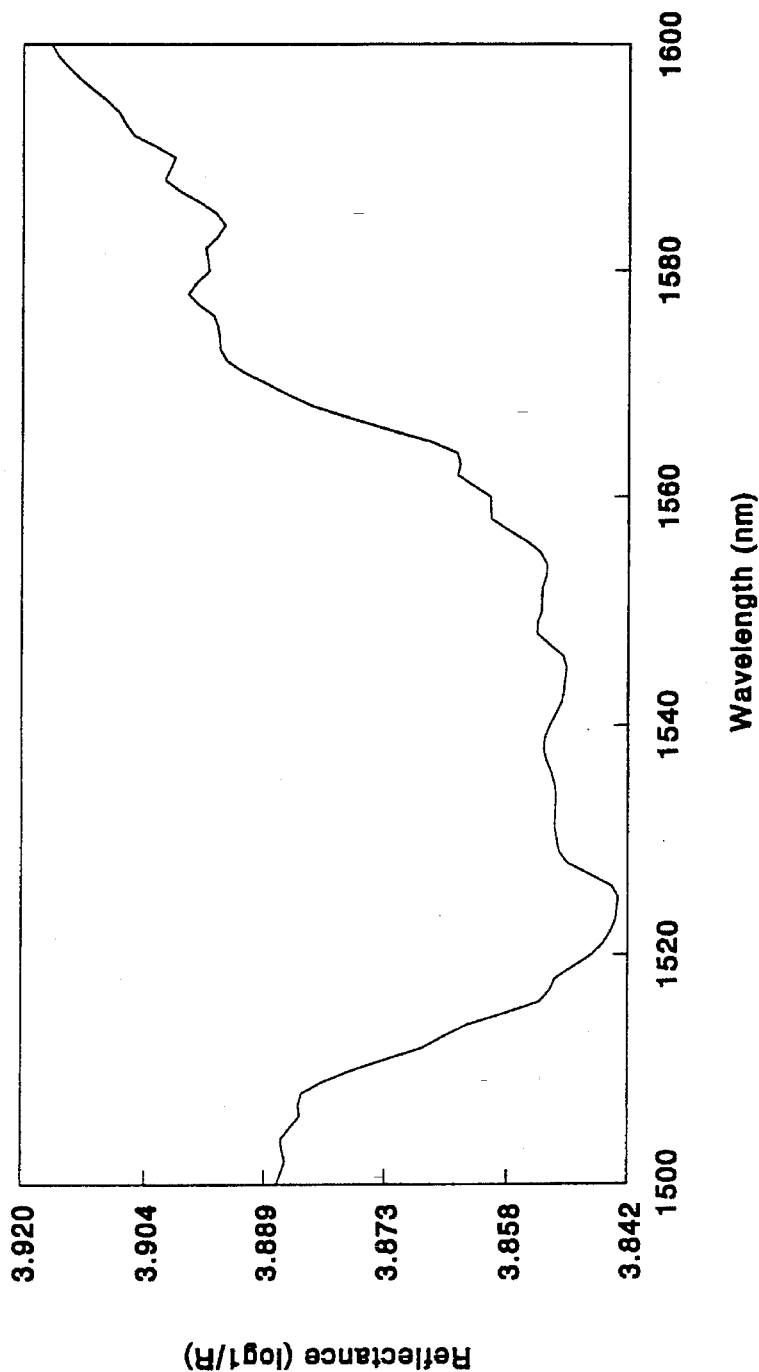
FIG. 9 is the reflectance spectrum of a natural geode stone mixed with quartz.

Shown in FIG. 9 is a reflectance spectrum of a natural geode stone mixed with quartz crystal. The spectrum is in the 1.5 μm region, acquired with only one LED centered at 1.55 μm being turned on. The preliminary results have presented in 32nd Annual Eastern Analytical symposium & Exposition, Somerset, N.J., Nov. 16, 1993, under the title "A pocket size, solid-state NIR spectrometer for space mission with small rovers", by Xiaolu Wang, Hanyi Zhang, Jolant Soos and Joy Crisp.

Thus, there has been described a novel optical spectrometer using a light emitting diode array, controlled by novel multiplexing schemes in place of a conventional broadband light source that has a number of novel features, and a manner of making and using the invention.

While a specific embodiment of the invention has been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure. Thus, the invention is not limited to the specific embodiment described herein, but is defined by the appended claims.

I claim:

1. A spectrometer comprising:
   a broad band light source, said source comprising an array of light emitting diodes, the individual diodes of which each emit a narrow wavelength band but the combination of which emit a desired range of wavelengths; switch means for controlling whether an individual diode is on or off at any given time; and multiplexing means for controlling said switch means so as to produce a desired total wavelength range; and
   a monochromator comprising an acousto-optic tunable filter means optically coupled and responsive to said broad band light source.

2. A spectrometer as in claim 1 wherein the multiplexing means comprises time domain multiplexing means;
   means by which each individual LED is turned on/off according to a specific time sequence so that a desired broad wavelength region can be covered within a given time span.

3. A spectrometer as in claim 1 wherein the multiplexing means comprises frequency domain multiplexing; and further comprising means by which each individual LED is modulated by reference signals with different frequencies through electrical bias currents.

4. A spectrometer as in claim 3 further comprising discrimination means for discriminating between light originated from different wavelength sub-regions according to modulated frequency.

5. A spectrometer as in claim 3 further comprising discrimination means for discriminating simultaneously between light originated from different wavelength sub-regions according to modulated frequencies.

6. A spectrometer comprising:

a broad band light source, said source comprising an array of light emitting diodes, the individual diodes of which each emit a narrow wavelength band but the combination of which emit a desired range of wavelength; the optical intensity of the LED array being amplitude modulated by a reference signal through electrical bias current;

a monochromator comprising an acousto-optic tunable filter optically coupled and responsive to said broad band light source;

a reference signal, and a lock-in amplifier for selectively amplifying a detected signal only if said signal is in proper phase and frequency compared to the reference signal.

* * * * *